Figure 1:
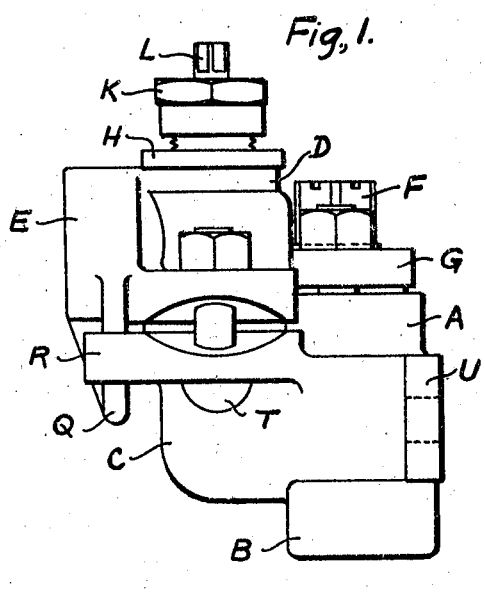

W. A. HARPER.
VALVE AND CONNECTIONS.
APPLICATION FILED OCT. 30, 1919.

1,355,964.

Patented Oct. 19, 1920.
2 SHEETS—SHEET 1.

Inventor-
William Augustine Harper,
By B. Singer, Atty.

W. A. HARPER.
VALVE AND CONNECTIONS.
APPLICATION FILED OCT. 30, 1919.

1,355,964.

Patented Oct. 19, 1920.
2 SHEETS—SHEET 2.

Inventor-
William Augustine Harper
By- B. Singer, Atty.

UNITED STATES PATENT OFFICE.

WILLIAM AUGUSTINE HARPER, OF SOMERVILLE, SEACOMBE, ENGLAND.

VALVE AND CONNECTIONS.

1,355,964.  Specification of Letters Patent.  Patented Oct. 19, 1920.

Application filed October 30, 1919. Serial No. 334,509.

*To all whom it may concern:*

Be it known that I, WILLIAM AUGUSTINE HARPER, a subject of the King of Great Britain and Ireland, residing at 41 Kingsley road, Somerville, Seacombe, in the county of Chester, England, have invented certain new and useful Improvements in Valves and Connections, of which the following is a specification.

This invention which relates to the valves or cocks and connections between fixed and portable piping in the hatchways of ships fitted for refrigerated cargoes, and like positions, provides means whereby the portable piping may be removed without spilling any of the brine or other cooling liquid.

In order that the exact object of this invention may be more clearly understood the following description of existing practice is given.

That part of the piping which is fitted into the bays of the hatchway of the ship, and which must be removed before any cargo can be unloaded is generally called the portable hatch grid and in order that the brine may be retained in it, sometimes valves, but more generally plug cocks (with straight through ports) are fitted to the inlet and outlet ends; these valves or cocks are bolted up to cocks, called coaming cocks, fixed to the permanent piping at the side of the hatch, and the practice hitherto has been to make and break the joints between the hatch grid and coaming cocks in a horizontal direction, with the result that in removing the hatch grid although all hatch grid and coaming cocks are closed, yet the liquid in the spaces or branches between hatch grid cocks and coaming cocks runs out and unless it is carefully caught by means of a bucket or a suitable tray the cargo upon which it falls will be stained and damaged.

According to this invention the branches of the fixed coaming cocks are made vertical and have superposed upon them the portable hatch grid cocks the position of the joints being at the same level as, or preferably a little above, the highest liquid spaces in the coaming cock or chest; when there is any excluded liquid between the hatch grid cocks and the ends of the portable piping upon the hatch grid cocks being closed, recesses are formed in the coaming cock branches into which fit corresponding spigots formed upon the hatch grid cocks, the spigots and recesses being proportioned so that the excluded liquid does not overflow when the hatch grid cocks are removed, but in order that this may be so the bottoms of recesses must be on the same level as, or preferably a little above, the highest liquid spaces of the coaming cock or chest.

In order that the quantity of excluded liquid may be as small as possible I prefer to use right angle valves for the hatch grids the valve seats being formed as near the bottom of the vertical branches as possible and with this arrangement the valve chest may be designed so that there is no excluded liquid whatever.

In order that this invention and the manner of performing the same may be properly understood I hereunto append an explanatory drawing to be hereinafter referred to.

Figure 3:
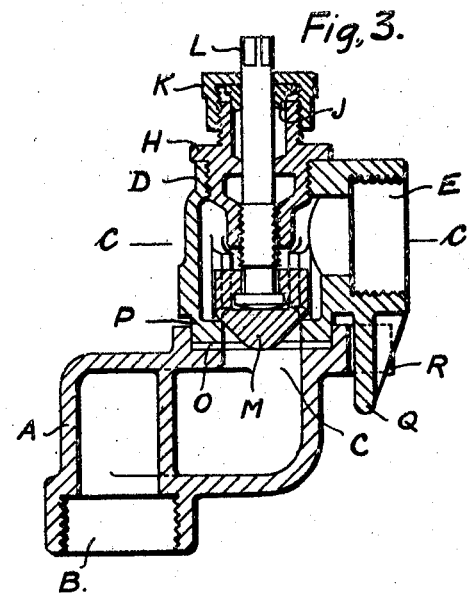
Figure 5:
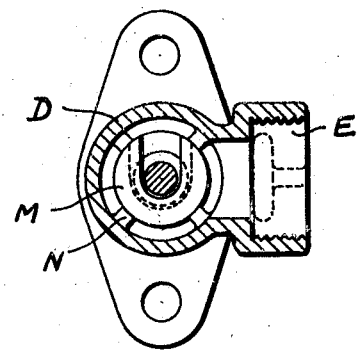
Figure 2:
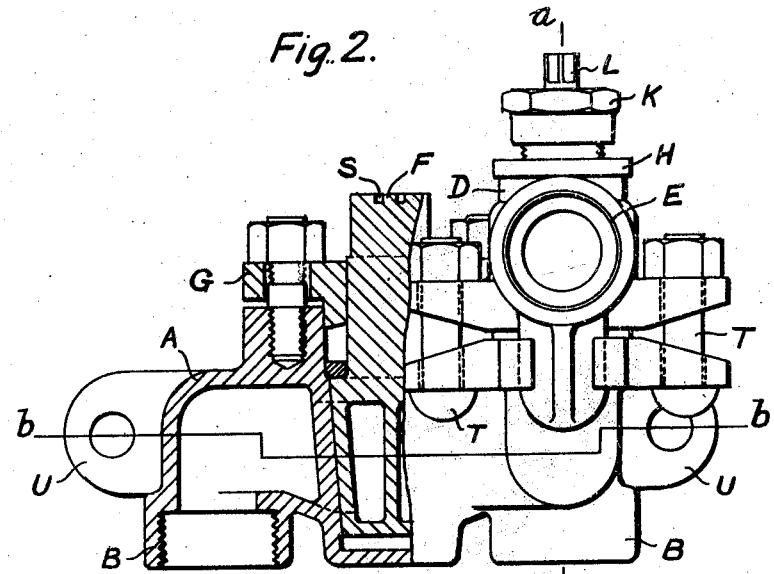
Figure 4:
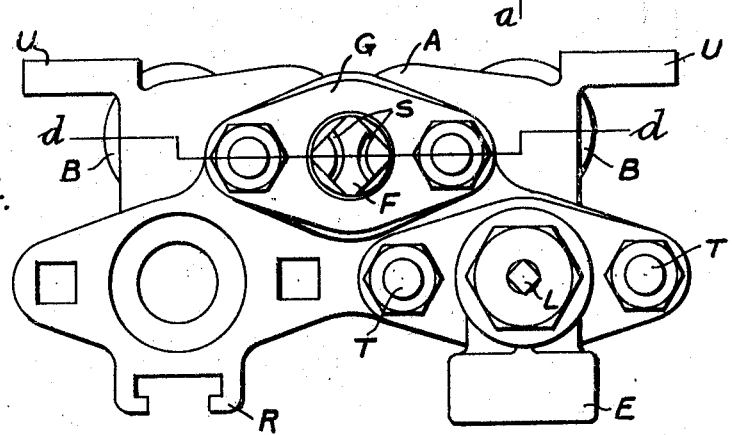
Figure 6:
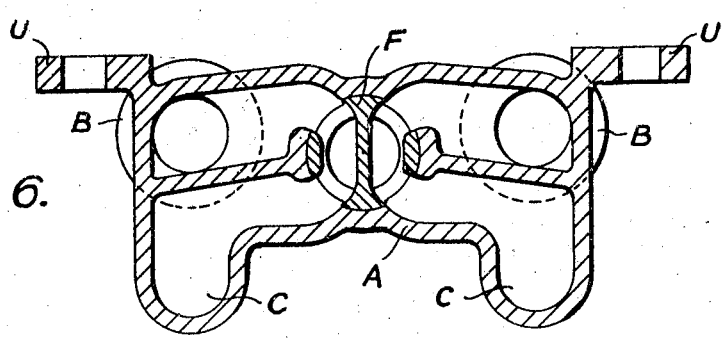

Figure 1 is an end elevation; Fig. 2 a part sectional elevation through $d\ d$ Fig. 4; Fig. 3 is a sectional end elevation through $a\ a$ Fig. 2; Fig. 4 is a plan with one of the hatch grid valves removed; Fig. 5 is a sectional plan of a hatch grid valve through $c\ c$, Fig. 3, and Fig. 6 is a sectional plan through $b\ b$ Fig. 2.

Figure 7:
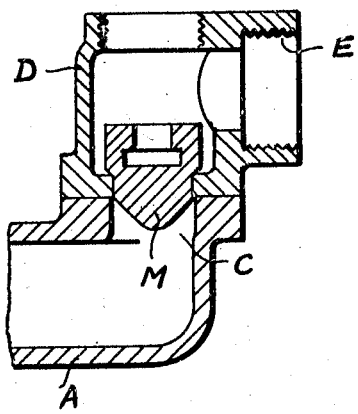

Fig. 7 is a detail sectional view, showing a modified construction.

In Figs. 1 to 7, A is the coaming cock chest which has four branches; the two branches B connect to the permanent or fixed piping and the two branches C to the hatch grid valve chests D which connect to the portable piping by the branches E. The four branches B and C communicate with four ports formed in the recess for the plug F, which has two passages as shown in the section Fig. 6. The gland G secures the plug F in the chest. H is the hatch grid valve cover. J is the gland bush, K the gland nut, L the valve spindle and M the valve which is guided by the guide strips N. O is the recess in the coaming cock branch into which fits the hatch grid valve spigot P, and in order to prevent the spigot and recess being damaged when the parts are being removed or replaced, on each valve chest is formed guides Q which fit into the slots R formed on the chest A.

The valve spindle L may have squares on the ends as shown for the operation with a spanner, or small handwheels may be fitted. A square is formed on the end of plug F and the grooves S show the positions of the passages in the plug body.

The valves are secured to the coaming cock chest by the bolts T, and the chest A can be secured in position in the hatch coaming by bolts through the lugs U.

The passage of brine is as follows:— When circulating through the portable section the valves M are open and plug F is in the position shown in Fig. 6, the brine entering say, by the left hand branch B and passing to the left hand valve chest D via the left hand port in plug F and the left hand branch C, then from the right hand valve chest D to the right hand branch B via right hand branch C and right hand port in plug F. When portable piping is removed plug F is in a position at right angles to that shown at Fig. 6 so that the brine passes from the left hand branch B to the right hand branch B via the port in F. Fig. 3 shows the hatch grid valves closed ready for removal and from the drawing it is obvious that the small quantity of excluded liquid will not flood the recess when the spigot is withdrawn.

Instead of a single double ported plug in the coaming cock the usual arrangement of two open bottom single ported plugs may be used.

If desired the two hatch grid valves or cocks may be cast together, also the spigots and corresponding recesses may be cylindrical, spherical or conical in from.

Fig. 7 shows an arrangement of hatch grid valve in which there is no excluded liquid whatever. This is effected by making cylindrical the part of the valve M which fits into the seat hole in chest D and while a greater lift is required to get a full opening through the valve, yet spigots and recesses can be dispensed with so long as the horizontal face of branch C is as high or a little higher than the highest liquid spaces in the coaming cock and chest.

What I claim and desire to secure by Letters Patent of the United States of America is:—

1. A coaming cock chest having branches for the attachment of fixed piping, and also having means to establish or cut off communication between said branches, in combination with members detachably secured to the cock chest, having branches for the attachment of portable piping, and arranged to respectively communicate with the branches of the cock chest, and also having means to open and close said branches.

2. A coaming cock chest having branches for the attachment of fixed piping, and also having means to establish or cut off communication between said branches, in combination with members detachably secured to the cock chest, having branches for the attachment of portable piping, and arranged to respectively communicate with the branches of the cock chest, and also having means to open and close said branches, said chest and said members being provided on their opposing sides, the one with recesses, and the other with projections to enter said recesses.

3. A coaming cock chest having branches for the attachment of fixed piping, and also having means to establish or cut off communication between said branches, in combination with members detachably secured to the cock chest, having branches for the attachment of portable piping, and arranged to respectively communicate with the branches of the cock chest, and also having means to open and close said branches, said chest and said members being provided on their opposing sides, the one with recesses, and the other with projections to enter said recesses, and being also provided with coacting guiding means to facilitate assembling and disassembling.

In witness whereof I have hereunto set my hand in the presence of two witnesses.

WILLIAM AUGUSTINE HARPER.

Witnesses:
FRANK R. GOW,
LABAN STUBBS.